Oct. 18, 1955 — J. I. LANTZ — 2,720,911
CONVERTIBLE BABY STROLLER AND CHILD'S SEAT FOR AUTOMOBILES
Filed Sept. 27, 1952 — 3 Sheets-Sheet 2
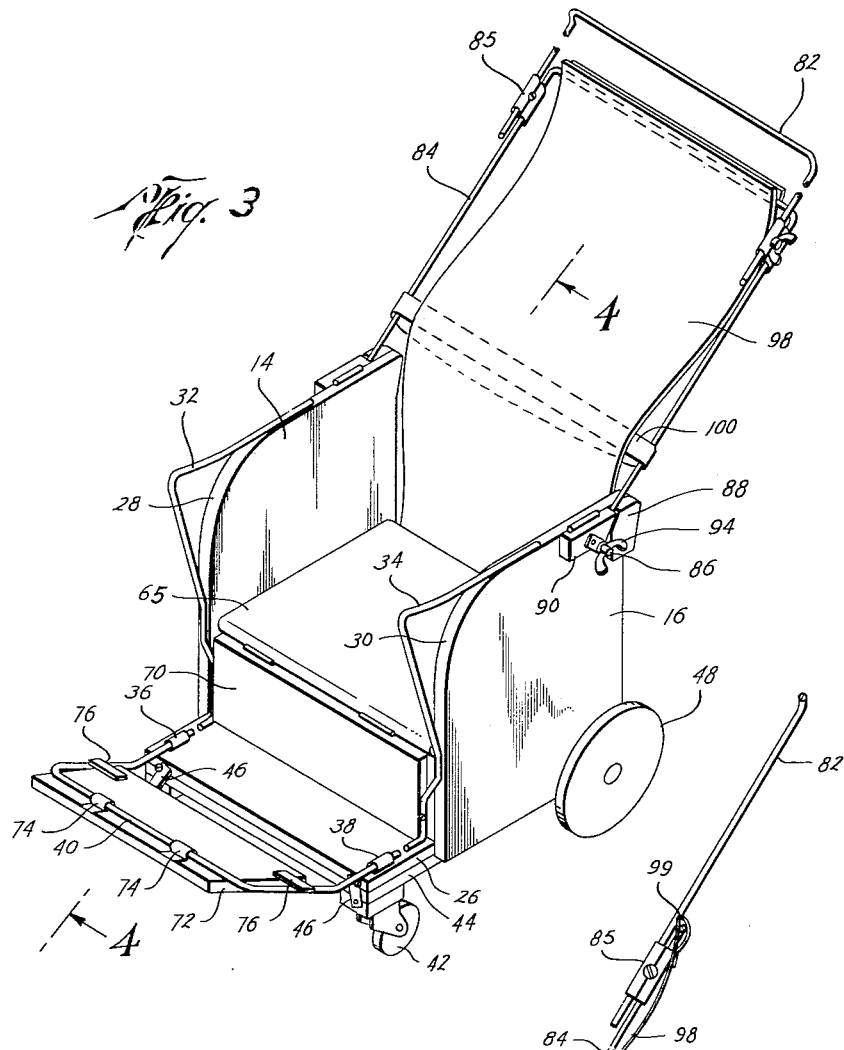
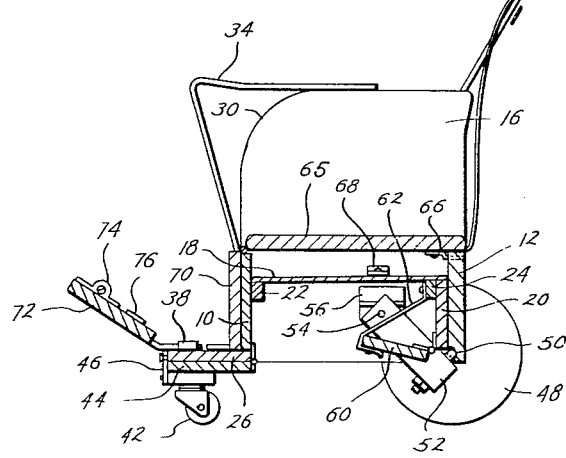
Joseph I. Lantz
INVENTOR.
BY Charles E. Lightfoot
ATTORNEY Oct. 18, 1955     J. I. LANTZ     2,720,911
CONVERTIBLE BABY STROLLER AND CHILD'S SEAT FOR AUTOMOBILES
Filed Sept. 27, 1952     3 Sheets-Sheet 3
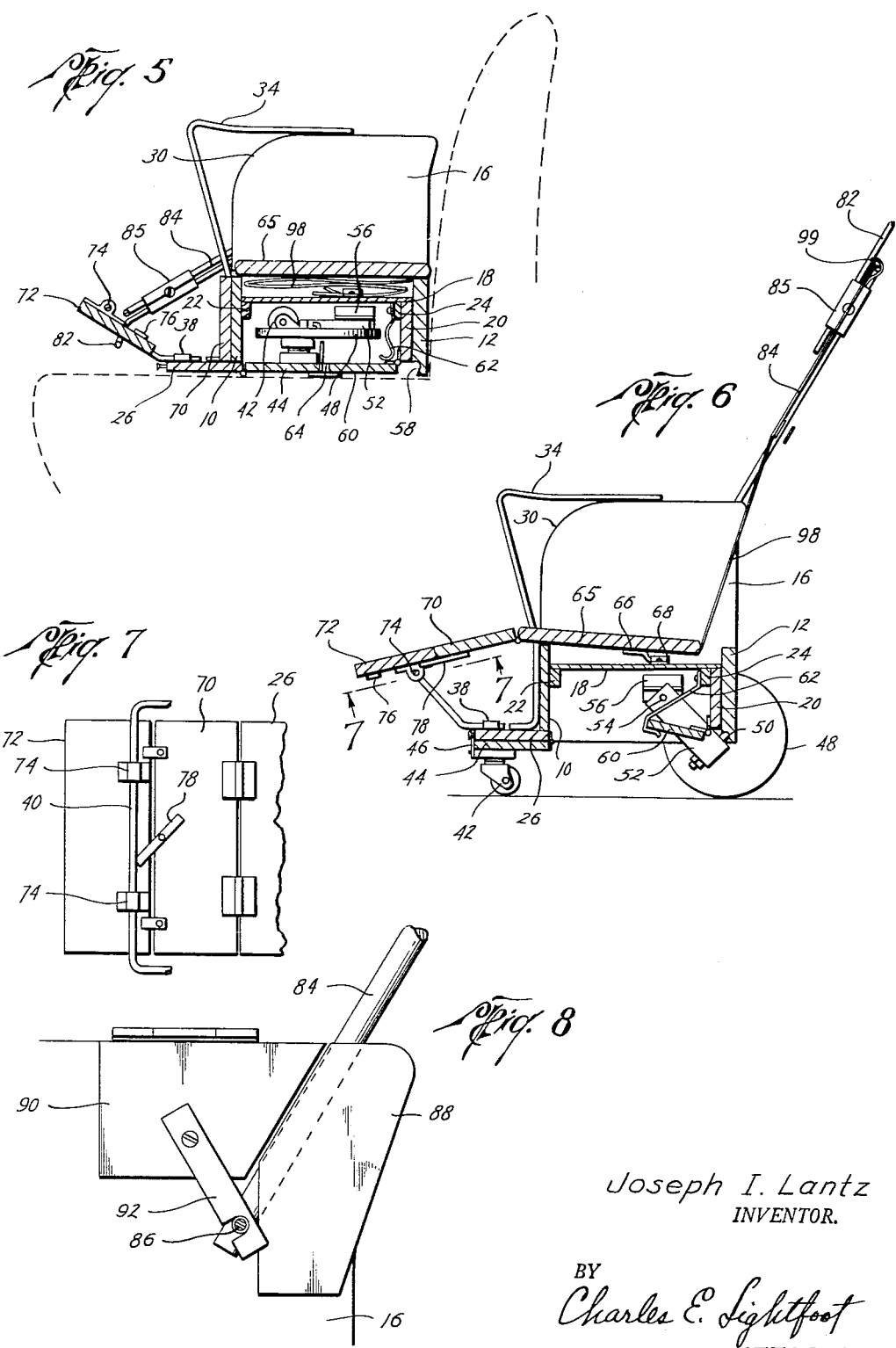
Joseph I. Lantz
INVENTOR.
BY
Charles E. Lightfoot
ATTORNEY United States Patent Office 2,720,911
Patented Oct. 18, 1955

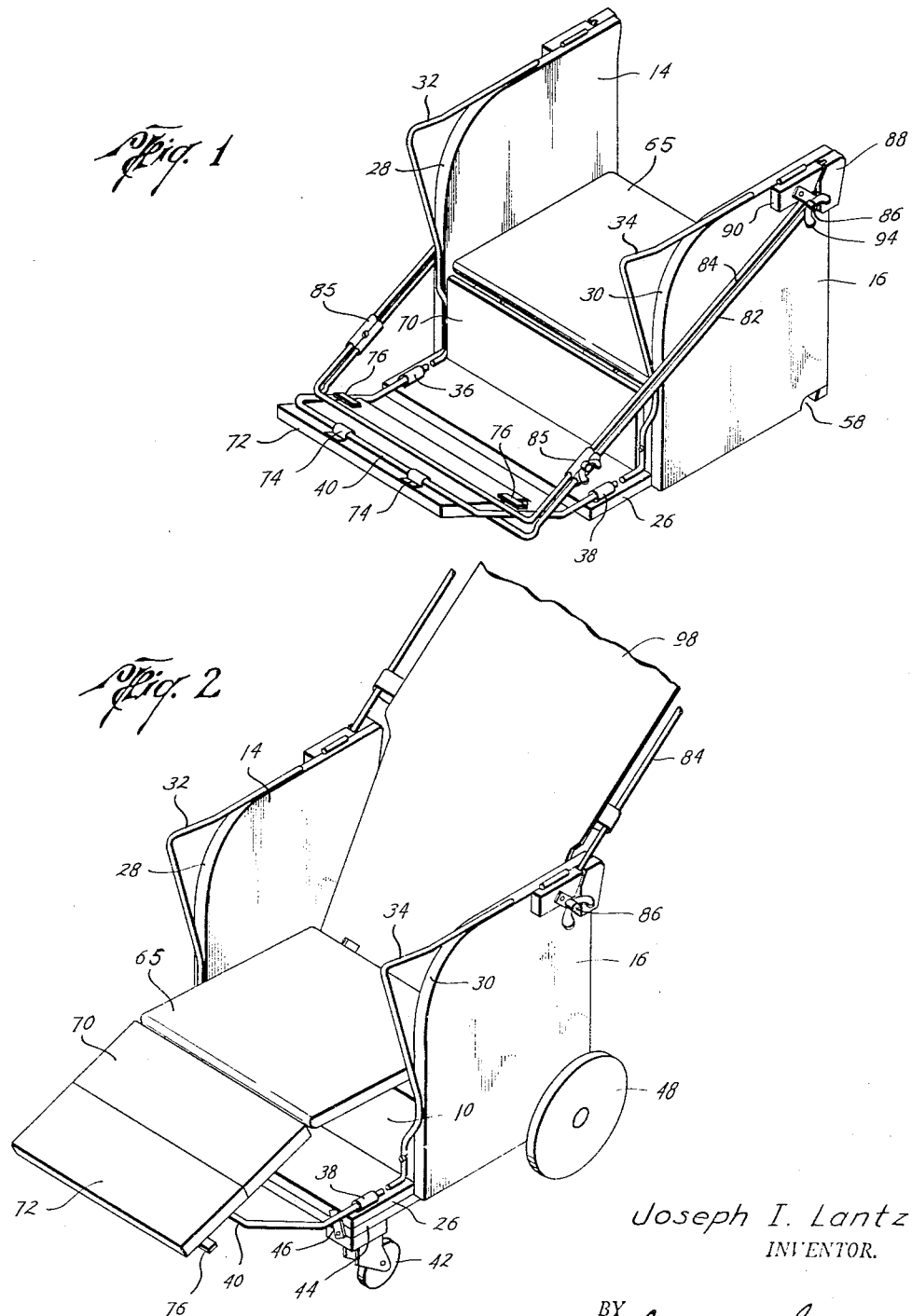

2,720,911

CONVERTIBLE BABY STROLLER AND CHILD'S SEAT FOR AUTOMOBILES

Joseph I. Lantz, Houston, Tex.

Application September 27, 1952, Serial No. 311,881

5 Claims. (Cl. 155—41)

This invention relates to a convertible baby stroller and child's seat for automobile.

An important object of the invention is to provide a convertible device which in unfolded condition forms a wheeled vehicle for use as a baby stroller, or for other convenient purposes, and which may be folded to serve as an auxiliary seat for children in conjunction with the seat of an automobile.

Another object of the invention is the provision of a convertible baby stroller and child's seat which is compactly foldable for convenient storage or transportation, and which is convertible for use when placed on an automobile seat as an auxiliary seat for a child, or which may also be converted for use as a baby stroller.

A further object of the invention is to provide a baby stroller whose parts are adjustable, and which may be arranged to enable the child to sit in an upright position or to permit the child to assume a reclining position, and which may be converted to form a child's seat for a vehicle.

A still further object of the invention is the provision of a device of the character referred to which when placed on the seat of an automobile forms a comfortable and safe seat for a child, and serves to prevent the child from being tossed about during the operation of the automobile.

The above and other important objects and advantages of the invention will best be understood from the following detailed description, constituting a specification of the same, when considered in conjunction with the annexed drawings, wherein—

Figure 1 is a perspective view of the invention in a folded condition for use as a child's seat when placed on the seat of an automobile;

Figure 2 is a fragmentary perspective view of the invention in an unfolded condition for use as a baby stroller, and arranged to permit a child to assume a reclining position therein;

Figure 3 is a perspective view of the invention showing the same in condition for use as a baby stroller, with the parts positioned to enable the child to sit in an upright position therein;

Figure 4 is a cross-sectional view, taken along the line 4—4 of Figure 3, looking in the direction indicated by the arrows;

Figure 5 is a vertical, central, cross-sectional view of the invention in its folded condition, and showing the arrangement of the parts when the device is used as a child's seat in conjunction with an automobile seat;

Figure 6 is a cross-sectional view, similar to that of Figure 4, showing the arrangement of the parts of the device when used as a baby stroller, and in condition for the child to be seated therein in a reclining position;

Figure 7 is a view taken along the line 7—7 of Figure 6, looking in the direction indicated by the arrows; and showing the details of construction of the adjustable foot and leg rests of the invention; and Figure 8 is a detail view, on a somewhat enlarged scale, showing the manner in which the handle of the device is mounted thereon and retained in unfolded condition.

Referring now to the drawings in greater detail, the invention has a body of generally rectangular configuration, made up of a front panel 10, a rear panel 12, and opposite side panels 14 and 16, forming a box-like structure. Within the body a bottom panel 18 is disposed, spaced above the bottom of the body, and supported on an inside transversely and vertically disposed panel 20, and front and rear transverse braces 22 and 24, respectively.

A horizontally disposed step member 26 extends across the front of the body, at the bottom thereof, and projects forwardly therefrom.

The forward edges of the side panels 14 and 16 are preferably rounded off above the bottom of the body, as indicated at 28 and 30, respectively, and a frame of wire, or the like, of generally U-shape, has its opposite arms attached at their free end portions to the top edges of the side panels, by any convenient means, such as screws, or the like, not shown, to form arm rests and hand hold portions 32 and 34, extending forwardly of the rounded off portions 28 and 30, respectively. The arms of the frame extend downwardly, and are attached to the outside of the front panel 10, and extend forwardly therefrom, passing through suitable fastening devices such as clips 36 and 38, secured to the step member 36 in any convenient manner, as by means of screws, not shown, and which secure the arms to the step member 26. The arms of the frame extend forwardly and upwardly from the step member 26, the bottom 40 of the U being disposed in outwardly spaced parallel relation to the forward edge of the step member.

The front of the body is supported on a pair of wheels or casters 42, 42, which are carried on a wheel support in the form of a flat board 44, or the like, which is hinged along one edge to the rear edge of the step member 26, so that the support may be moved to a position lying beneath the step member, with the wheels or casters 42 extending downwardly, as seen in Figures 2, 3, 4 and 6, in which position the support may be latched to the forward edge of the step member by suitable latches, indicated at 46, 46, which may take the form of hooks pivotally attached to the board 44 and which are engageable with pins on the forward edge of the step member, or the support may be swung to a position within the bottom of the body, as best seen in Figure 5, with the wheels 42, 42 positioned inside of the body. The front wheels 42 are preferably mounted on the support 44 for swiveling movement, whereby the device may be easily steered in propelling the same along the ground.

The body is supported at the rear on a pair of wheels 48, 48. Each of the wheels 48 is carried on a separate shaft 50, which has two arms arranged at right angles, the wheel being journalled on one of these arms, and the other of the arms extending through the lower end of a supporting block 54, for pivotal movement in the block. Each of the blocks is pivotally supported at its upper end on a pin 54, attached to one member of a hinge 56, which is in turn attached to the inside of the corresponding side panel of the body. The side panels of the body are formed with notches 58 at the rear ends of their bottom edges, as best seen in Figure 1 of the drawings, in which notches the shafts 50 are received, when the rear wheels are in active positions.

By reason of the pivotal connections 54 of the supporting blocks 52 on the hinges 56, the shafts 50 may be moved out of the notches 58, and the wheels 48 may then be moved by rotation of the shafts in the lower ends of the supporting blocks 52, to positions in which the wheels 48 may be moved into the bottom of the body when the supporting blocks 52 are swung upwardly into the body on the hinges 56. In this manner the wheels 48, may be positioned within the bottom of the body, as best seen in Figure 5 of the drawings, when the device is to be used as a child's seat in connection with the seat of an automobile. In moving the wheels 48 from their folded positions as seen in Figure 5 to their active positions, as illustrated in Figures 2, 3, 4 and 6, the supporting blocks 52 are first swung downwardly on the hinges 56, after which the blocks are pivoted about the pivot pins 54, to position the shafts 50 in the notches 58, as clearly indicated in Figures 5 and 6 of the drawings.

There is a closure member 60, in the form of a flat board, which is hingedly connected along one edge to the inner panel 20, so that this closure member may be moved to a position between the supporting blocks 52 when the wheels 48 are in active positions, to hold the supporting blocks against swinging movement on the hinges 56, as will be apparent from an inspection of Figures 4 and 6 of the drawings. A strap, or similar fastening member 62 is connected at one end to the brace 24, and at its other end is releasably secured to the closure member 60, as by means of a snap fastener or the like, whereby the closure member may be retained in position to hold the supporting blocks 52 in their extended positions. The closure member 60 also carries a pivoted latch 64, at its forward edge, which may take the form of a flat metal plate, having a free end which is engageable beneath the adjacent edge portion of the front wheel supporting member 44, when the wheels are in their inactive positions within the body, to retain the members 44 and 60 in their closed positions as shown in Figure 5.

A removable and adjustable seat 65 is provided, which may be positioned horizontally, and supported upon the upper edges of the front and back panels 10 and 12, as seen in Figures 1, 3 and 5, and this seat member is provided on its under surface with clips or lugs, such as that indicated at 66 in Figures 4 and 6 of the drawings, the free ends of the clips being adapted to fit into retainer members 68, in the form of inverted U-shaped straps secured to the upper surface of the bottom panel 18, by suitable means, such as screws, whereby the seat may be held in a position to extend somewhat beyond the front panel 10, as best seen in Figure 6 of the drawings. The rear panel 24 may be provided at its upper edge with recesses, or the like, to receive the free ends of the clips 66, when the seat is supported on the front and rear panels, in the position illustrated in Figures 1, 3, 4 and 5.

A leg rest element 70 is hingedly secured to the forward edge of the seat 65, so that it may assume a vertical position lying against the outer surface of the forward panel 10, in the condition of the device illustrated in Figures 1, 3, 4 and 5 or may be extended, when the seat is moved to its extended position, as best seen in Figures 2, 6 and 7 of the drawings.

A second leg rest member 72 is pivotally attached to the portion 40 of the wire frame, by means of tubular clips 74, or the like, so that this member may be swung to the position indicated in Figures 1, 3 and 5 of the drawings, wherein it serves as a foot rest. The member 72 is also provided with suitable latch elements 76, which may be extended above the wire frame, to retain the member in position for use as a foot rest. The member 72 may also be rotated about the portion 40 of the wire frame, to the position seen in Figures 2, 6 and 7, in which position it forms an extension of the leg rest member 70, and is releasably latched thereto by suitable latch means pivoted to the underside of member 72, such as that indicated at 78 in Figures 6 and 7.

An extensible handle is also provided for the device, which may take the form of a pair of U-shaped members 82 and 84, formed of wire or the like, one of which members is pivotally secured at the outer ends of its arms to bolts such as that indicated at 86, attached to the side panels 14 and 16 near the upper and rear edges of the same, while the other member 82 is slideably carried on the member 84, and adjustably secured thereto by suitable fastening means, such as double cylindrical tube halves clamped to the wire members by screws indicated at 85.

In order to retain the handle in its active position as seen in Figures 2, 3, 4, 6 and 8 of the drawings, each of the side panels 14 and 16 is provided with a block 88 at the upper end of its rear edge, which has an inclined face, against which the handle member 84 may rest, and forwardly of the block 88 there are the blocks 90, which are hingedly connected to the upper edges of the side panels, and which may be swung downwardly to engage and retain the handle member 84 in its extended position. Suitable latch means, such as that indicated at 92 is carried by each of the blocks 90, which are engageable over the bolts 86, to retain the block 90 in latching position. Fastening means, such as wing nuts 94 are provided on the bolts 86, for retaining the latches 92 securely in latching position. By releasing the latches 92, and swinging the blocks 90 upwardly, the handle members may be swung forwardly into the positions shown in Figures 1 and 5, wherein the member 82 extends beneath the foot rest member 72, while the member 84 is above the same, thus serving to more securely hold the foot rest in position, when the device is in condition for use as a child's seat.

A back element 98 is also provided which is preferably formed of fabric or other suitable flexible material, and which is secured at its bottom end to the rear edge of the seat 64, extending upwardly therefrom between the side arms of the handle elements 82 and 84. The back 94 may have two plies at its upper end which may be connected together by suitable means such as a zipper 99, or the like, whereby the upper end of the back may be attached to the handle element 84, as best seen in Figures 3, 4 and 6 of the drawings. A supporting strap 100, or the like, may be looped about the side arms of the handle element 84, behind the back 98, to afford an additional support for the same. The flexible back 98 is preferably secured to the seat 64 by means of snap fasteners or the like, whereby the back may be removed and stored beneath the seat, as seen in Figure 5, when the device is to be used as a child's seat in conjunction with an automobile seat.

In making use of the invention as described above, it may be folded into the condition illustrated in Figures 1 and 5, for use as a child's seat in conjunction with an automobile seat, and in this condition of the device the wheels are stored away within the body beneath the seat, and the member 72 is in position to act as a foot rest. When the device in this condition is positioned on the seat of an automobile in the manner indicated in Figure 5, wherein the seat of the automobile is represented in dotted lines, a child may sit on the seat in comfort and without any danger of being tossed or rolled about during the operation of the vehicle.

When it is desired to use the device as a baby stroller, it may be placed in the condition illustrated in Figures 3 and 4, wherein the handle is elevated, the wheels are in active positions, and the seat and back are in position for a child to sit upright in the stroller.

If desired the stroller may also be arranged so that the child may occupy the same in a reclining position, and for this purpose the parts are arranged in the condition illustrated in Figures 2 and 6, wherein the seat 65 is moved forward, and retained in that position by inserting the free ends of the clips 66 in the retainers 68, while the leg rest elements 70 is swung outwardly and latched to the member 72, which has been moved to a position to form an extension of the leg rest member. In this condition of the device it will be seen that the back 98 slopes upwardly, so that the child may assume a reclining position with the legs resting on the members 70 and 72.

It will thus be seen that the invention, as described above, provides a device which may be readily converted for use either as a child's seat in conjunction with the seat of an automobile or which may be readily adjusted for use as a baby stroller in which the child may sit in an upright position, or may assume a reclining position when desired.

While the invention has been described in connection with a certain specific embodiment of the same, it will be understood that this is intended by way of illustration only, and that numerous changes can be made in the construction and arrangement of the various parts, without departing from the spirit of the invention or the scope of the appended claims.

Having thus clearly shown and described the invention, what is claimed as new and desired to secure by Letters Patent is:

1. In a device of the character described, a generally box-shaped body having upright front and rear walls and upright side walls extending above said front and rear walls, a bottom panel supported on said front and rear walls, a horizontally disposed step on the body extending forwardly from said front wall adjacent the bottom edge thereof, a seat supported in one position on the upper edges of said front and rear walls between said side walls, and adjustable to another position extending forwardly beyond said front wall and supported on said front wall and said bottom panel, and a leg rest member hingedly connected to the forward edge of said seat and adapted to be positioned vertically against said front wall when said seat is in said one position, and means for supporting said leg rest member in a forwardly extending position outwardly of said front wall and spaced above said step when said seat is in said other position.

2. In a device of the character described, a generally box-shaped body having upright front and rear walls and upright side walls extending above said front and rear walls, a bottom panel supported on said front and rear walls below the upper edges thereof, a horizontally disposed step on the body extending forwardly from the bottom edge of said front wall, a seat supported in one position on the upper edges of said front and rear walls, and moveable to another position extending beyond said front wall, interengageable means on said seat and bottom panel for retaining said seat in said other position, a U-shaped frame carried by the body whose bottom portion extends forwardly of said step member, and a leg rest member hingedly connected to the forward edge of said seat and adapted to be positioned vertically against said front wall when said seat is in said one position and in a forwardly extending position above said step when said seat is in said other position, and means on said bottom portion of said frame engageable with said leg rest in said forwardly extending position.

3. In a device of the character described, a generally box-shaped body having upright front and rear walls and upright side walls extending above said front and rear walls, a seat supported in one position on the upper edges of said front and rear walls and movable to another position extending forwardly beyond said front wall, an inverted U-shaped handle whose length is adjustable attached at its lower end to said side walls at the rear of the body and extending above the same, and a flexible back on said seat and supported on said handle.

4. In a device of the character described, a generally box-shaped body having upright front and rear walls, a step extending forwardly from the front wall adjacent the bottom edge thereof, a U-shaped frame carried by the body whose bottom portion extends forwardly of the step, a seat supported in one position on said front and rear walls and moveable to another position extending forwardly of said front wall, a leg rest hinged connected to the forward edge of the seat and adapted to occupy a vertical position against said front wall when the seat is in said one position and to be moved to a forwardly extending position above said step when said seat is in said other position, a foot rest pivotally supported on said bottom portion of said frame, means on said foot rest engageable with said frame to maintain said foot rest in a position for engagement by the feet of a child seated on said seat, said foot rest being moveable to another position to form an extension of said leg rest.

5. In a device of the character described, a generally box-shaped body having upright front and rear walls and upright side walls extending above said front and rear walls, a bottom panel supported on the front and rear walls and forming with said front and rear walls and said side walls a downwardly opening compartment, front and rear wheels hingedly connected to said body and movable to active positions to support said body and to inactive positions within said compartment, a step extending forwardly from the front wall adjacent the bottom edge thereof, a U-shaped frame carried by the body whose bottom portion extends forwardly of the step, a seat supported in one position on said front and rear walls and moveable to another position extending forwardly of said front wall, a leg rest hinged connected to the forward edge of the seat and adapted to occupy a vertical position against said front wall when the seat is in said one position and to be moved to a forwardly extending position above said step when said seat is in said other position, a foot rest pivotally supported on said bottom portion of said frame, means on said foot rest engageable with said frame to maintain said foot rest in a position for engagement by the feet of a child seated on said seat, said foot rest being moveable to another position to form an extension of said leg rest.

References Cited in the file of this patent

UNITED STATES PATENTS

| | | |
|---|---|---|
| 1,122,833 | Withrow | Dec. 29, 1914 |
| 1,370,886 | Genge | Mar. 8, 1921 |
| 1,378,598 | Meyers | May 17, 1921 |
| 2,002,836 | Rossi | May 28, 1935 |
| 2,017,433 | Carrington | Oct. 15, 1935 |
| 2,625,407 | Varner | Jan. 13, 1953 |